US009944171B2

(12) United States Patent
Kerin, Jr. et al.

(10) Patent No.: US 9,944,171 B2
(45) Date of Patent: Apr. 17, 2018

(54) CAPLESS AUTOMOTIVE FUELING SYSTEM WITH MISS-FUEL INHIBITOR

(71) Applicant: Martinrea Industries, Inc., Troy, MI (US)

(72) Inventors: James J. Kerin, Jr., Grosse Pointe Woods, MI (US); Sorin Stancu, Dearborn, MI (US); Jerry Walter Fearn, Mayville, MI (US)

(73) Assignee: Martinrea Industries, Inc., Auburn Hills, MI (US)

( * ) Notice: Subject to any disclaimer, the term of this patent is extended or adjusted under 35 U.S.C. 154(b) by 193 days.

(21) Appl. No.: 15/005,110

(22) Filed: Jan. 25, 2016

(65) Prior Publication Data

US 2016/0221435 A1    Aug. 4, 2016

Related U.S. Application Data

(60) Provisional application No. 62/109,810, filed on Jan. 30, 2015.

(51) Int. Cl.
*B60K 15/05* (2006.01)
*B60K 15/04* (2006.01)

(52) U.S. Cl.
CPC ...... *B60K 15/04* (2013.01); *B60K 2015/0429* (2013.01); *B60K 2015/0461* (2013.01); *B60K 2015/0483* (2013.01)

(58) Field of Classification Search
CPC ............ B60K 15/04; B60K 2015/0424; B60K 2015/0461; B60K 2015/0483

(Continued)

(56) References Cited

U.S. PATENT DOCUMENTS 3,730,216 A * 5/1973 Arnett .................... B60K 15/04
137/588
6,302,169 B1   10/2001 Pulos
(Continued)

FOREIGN PATENT DOCUMENTS

EP            1690727         8/2006
RU            138338          3/2014

*Primary Examiner* — J. Gregory Pickett
*Assistant Examiner* — Niki M Eloshway
(74) *Attorney, Agent, or Firm* — Dinsmore & Shohl LLP

(57) ABSTRACT

A fuel inlet assembly for an automotive vehicle having an elongated tubular and cylindrical housing open at each end and defining a port in between the ends of the housing. A flapper valve is associated with the fluid port and is movable between an open and a closed position. At least two latches are pivotally mounted to the housing adjacent the fluid port and movable between a latch position and a release position. The latches engage the flapper valve to prevent the flapper valve from moving to its open position. A flexible bump is attached to each latch so that the bump pivots with its associated latch and each bump protrudes radially inwardly from its associated latch. Each bump has a cam surface which, when engaged by a fuel nozzle, pivots the bump and its associated latch to the release position. However, the latch is collapsible in a radially outward direction towards its associated latch when that latch is in its release position thus enabling a fuel nozzle to pass past the collapsed bumps and engage the flapper valve. As such, only a fuel nozzle with a predetermined size range will engage the bumps and pivot the latches to an open position and also allow the fuel nozzle to pass the bumps and extend through the fluid port.

12 Claims, 4 Drawing Sheets

(58) Field of Classification Search
USPC .............................................. 220/86.2, 86.1
See application file for complete search history.

(56) References Cited

U.S. PATENT DOCUMENTS

| | | | | |
|---|---|---|---|---|
| 6,994,130 | B1 | 2/2006 | Gabbey et al. | |
| 7,293,586 | B2 * | 11/2007 | Groom | B60K 15/04 141/301 |
| 2007/0034287 | A1 * | 2/2007 | Groom | B60K 15/04 141/350 |
| 2009/0165891 | A1 * | 7/2009 | Candelise | B60K 15/04 141/346 |
| 2010/0132838 | A1 * | 6/2010 | Cisternino | B60K 15/04 141/349 |
| 2010/0175785 | A1 * | 7/2010 | Groom | B60K 15/04 141/350 |
| 2014/0284329 | A1 * | 9/2014 | Frank | B60K 15/03006 220/86.2 |
| 2014/0352846 | A1 * | 12/2014 | Ryu | B60K 15/04 141/350 |
| 2015/0048087 | A1 * | 2/2015 | Hagano | B60K 15/04 220/86.2 |
| 2015/0298542 | A1 * | 10/2015 | Kim | B60K 15/04 220/86.2 |
| 2016/0152133 | A1 * | 6/2016 | Hendler | B60K 15/04 220/86.2 |
| 2017/0158048 | A1 * | 6/2017 | Giles | B60K 15/04 |

* cited by examiner

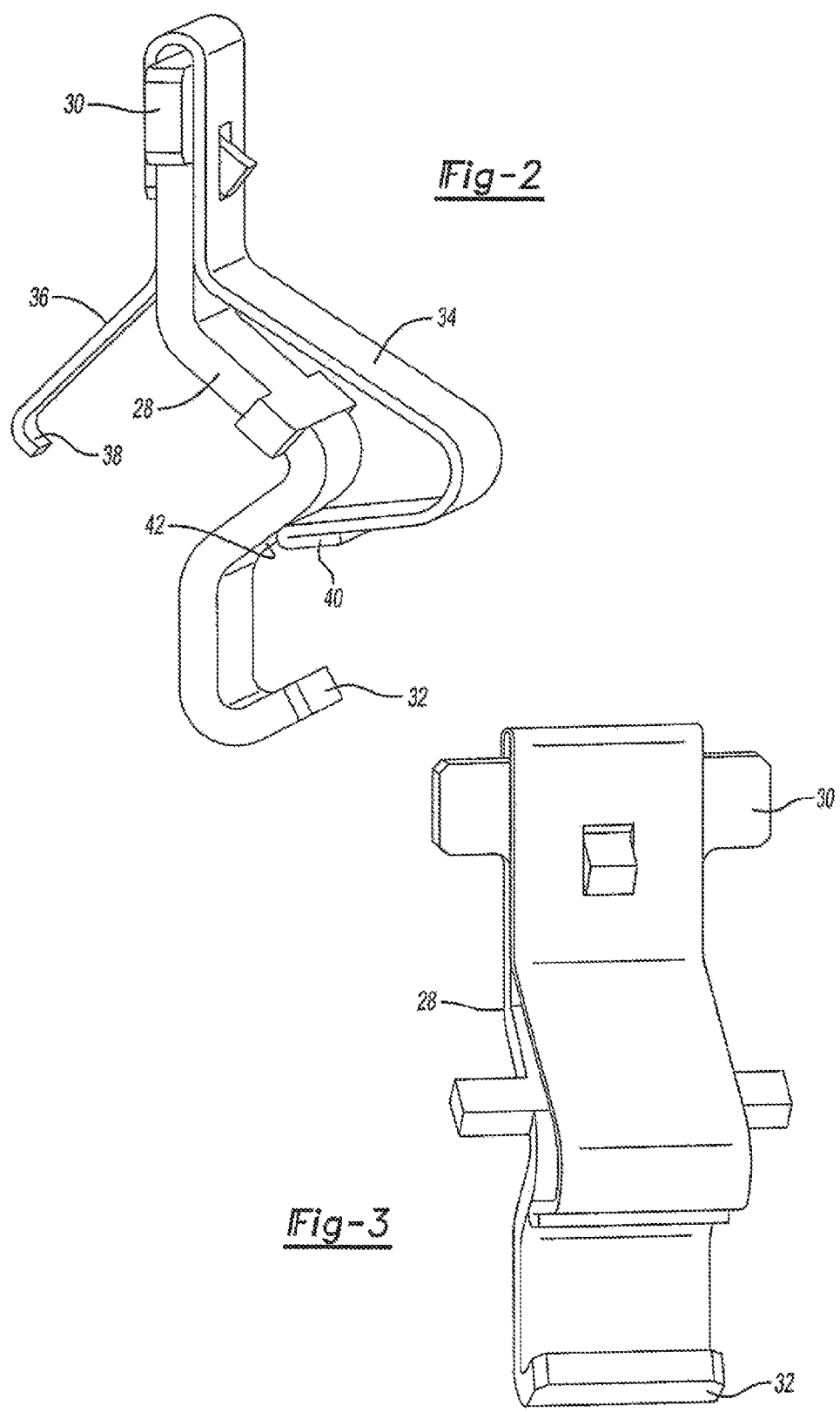

CAPLESS AUTOMOTIVE FUELING SYSTEM WITH MISS-FUEL INHIBITOR

CROSS-REFERENCE TO RELATED APPLICATIONS

This application claims priority of U.S. Provisional Application 62/109,810 filed Jan. 30, 2015, the contents of which are incorporated herein by reference.

BACKGROUND OF THE INVENTION

I. Field of the Invention

The present invention relates to automotive fuel filling systems.

II. Description of the Related Art

All automotive vehicles include fueling systems to allow the fuel tank for the vehicle to be refilled. Typically, the fueling system includes a funnel which is dimensioned to receive a conventional fuel filling nozzle. The funnel in turn is connected to the fuel tank for the vehicle. Many of these fuel filling systems also include an orifice inserted into or formed as a part of the funnel which is dimensioned to receive the neck of the fuel filling nozzle. A spring loaded flapper valve is also oftentimes mounted to the funnel and movable between an open and a closed position and urged towards its closed position by the spring. Upon insertion of the fuel filling nozzle into the orifice, the fuel filling nozzle contacts and moves the flapper valve to an open position to enable fueling of the vehicle.

One disadvantage of the conventional fuel filling systems for automotive vehicles is that the flapper valve which closes the funnel port is freely movable between an open and a closed position. Fuel nozzles, furthermore, have standardized diameters depending upon the type of fuel. For example, a fuel nozzle for unleaded gasoline has a first diameter while a fuel nozzle for diesel fuel has a second and larger diameter.

The size of the fuel port in the fuel funnel assembly is dimensioned for the type of fuel utilized by the engine. Consequently, since the fuel nozzle for diesel fuel has a larger diameter than the fuel nozzle for unleaded gasoline, the fuel, nozzle for diesel fuel cannot be inserted into the fuel funnel assembly for a vehicle which utilizes unleaded gasoline.

Unfortunately, the converse is not true. Instead, since the fuel nozzle for unleaded gasoline is smaller in diameter than the fuel nozzle for diesel fuel and also since the fuel flapper valve is normally freely pivotably mounted to the fuel funnel assembly, it is possible to inadvertently fuel the fuel tank of a vehicle having a diesel engine with unleaded gasoline. This, in turn, results in damage if not total destruction of the engine.

In order to prevent refueling a diesel engine fuel tank with unleaded gasoline, there have been previously known miss-fuel inhibitors (MFI) which prevent a diesel fuel tank from being filled with unleaded gasoline even though unleaded gasoline utilizes a smaller fuel filling nozzle size. One such MFI is disclosed in U.S. Pat. No. 6,968,874.

In the '874 patent, a pair of diametrically opposed latches engage and hold the flapper valve in its closed position. Each latch, furthermore, includes an actuator surface which, when physically engaged, forces the latch outwardly thus releasing the flapper valve.

With this previously known MFI, upon insertion of the larger diameter diesel fuel nozzle into the fuel filling system, the diesel fuel filling nozzle has a diameter sufficiently large so that it engages the actuator surface on both latches thus moving both latches to an open position and allowing refueling of the fuel tank with diesel fuel. Conversely, upon insertion of a smaller diameter unleaded fuel nozzle, at most, a single actuator surface on one of the latches so that the other latch will maintain the flapper valve in a closed position and prevent refilling of the diesel fuel tank with unleaded gasoline.

A further complication, however, arises with diesel fuel since diesel fuel nozzles vary in size from about 24.5 millimeters to about 32 millimeters depending upon the type of automotive vehicle. For example, commercial vehicles utilizing diesel fuel oftentimes have the larger size fuel filling nozzle whereas passenger vehicles with diesel engines typically have the smaller diameter diesel nozzles.

It would, of course, be possible to simply design an MFI for diesel fuel in which the diesel fuel nozzle pivots the latches to an open position whenever the fuel filling nozzle is greater than 24.5 millimeters in diameter. However, if the larger diameter fuel filling nozzle of 32 millimeters were inserted into the same fuel filling system, the fuel filling nozzle would pivot the latches outwardly to such an extent that the overall diameter of the fuel filling system would necessarily be increased. Such an increase in the diameter of the fuel filling system is unacceptable for many automotive applications.

SUMMARY OF THE PRESENT INVENTION

The present invention provides a miss-fuel inhibitor which overcomes the above-mentioned disadvantages of the previously known fuel filling systems for diesel fuel. In particular, the fuel filling system of the present invention is able to accommodate a wide range of diameters of the diesel fuel filling nozzle, e.g. 24.5 millimeters to 32 millimeters, without increasing the overall size of the housing for the fuel filling system.

In brief, in the present invention, a collapsible bump is attached to each latch so that the humps protrude radially inwardly relative to the fuel filling system. These bumps, furthermore, are dimensioned so that, upon the insertion of a relatively small diameter diesel fuel nozzle, e.g. 24.5 millimeters, the fuel filling nozzle will engage the bumps and pivot the latches to their release position thus enabling fueling of the diesel fuel tank.

Conversely, upon the insertion of a larger diameter diesel fuel nozzle into the fuel system, the fuel nozzle will contact the bumps and pivot the latches radially outwardly to a release position for the flapper valve. However, when the latches contact the housing for the fuel filling system, the continued insertion of the fuel filling nozzle toward the flapper valve will deform the bumps and still permit the fuel filling nozzle to engage and open the flapper valve for refilling of the diesel fuel tank.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which:

FIG. 2 is an elevational view illustrating one latch with its attached bump and enlarged for clarity;

FIG. 3 is a view similar to FIG. 2, but from a different elevational angle;

DETAILED DESCRIPTION OF PREFERRED EMBODIMENTS OF THE PRESENT INVENTION

Figure 1:
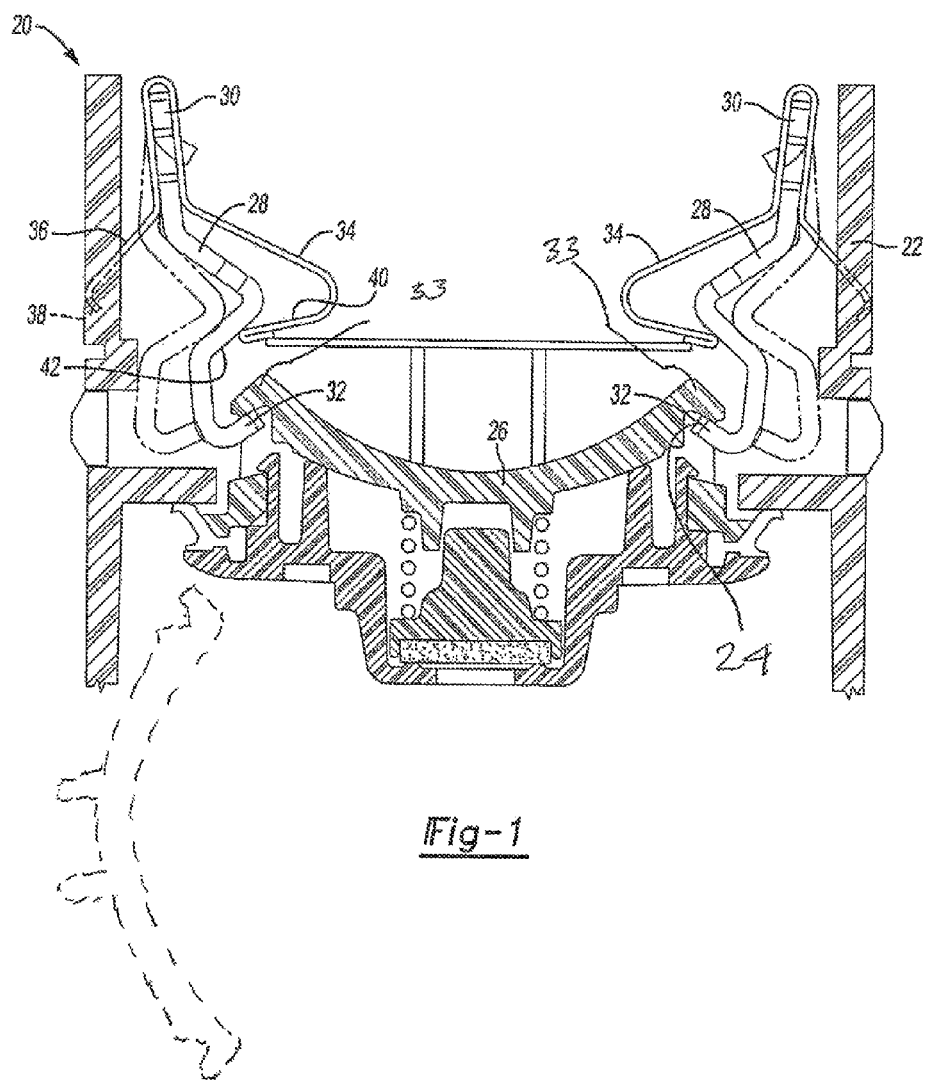
FIG. 1 is a longitudinal sectional view illustrating a fuel filling system according to the present invention.

With reference first to FIG. 1, a portion of the fuel filling system 20 of the present invention is shown. The system includes a generally cylindrical housing 22 having a fuel port 24 formed through it. The fuel port 24 is dimensioned to receive the fuel filling nozzle for diesel fuel.

A flapper valve 26 is contained within the housing 22 and movable between a closed position, illustrated in solid line in FIG. 1, and an open position, illustrated in phantom line in FIG. 1A spring urges the flapper valve 26 towards its closed position and, when closed, the flapper valve 26 prevents contaminants from entering into the fuel tank.

Still referring to FIG. 1, a pair of diametrically opposed latches 28 are each pivotably mounted at their respective upper ends 30 and pivotable between a locked position, illustrated in solid line in FIG. 1, and a release position, illustrated in phantom line in FIG. 1. In their locked position, a hook 32 formed on the free end of each latch 28 engages a lip 33 formed on the flapper valve. When in their locked position, the latches 28 prevent the flapper valve 26 from moving to its open position. Conversely, when the latches 28 are moved to their release position (phantom line), the flapper valve 26 is free to move to its open position (phantom line).

With reference now to FIGS. 1-3, each latch 28 is rigid in construction and constructed, for example, of a rigid plastic material. However, a flexible and deformable bump 34 is attached to the upper end 30 of each latch 28. These bumps 34 protrude radially inwardly, as best shown in FIG. 1, into the passageway designed to receive the fuel filling nozzle for diesel fuel.

Each bump also preferably includes a spring 36 having a free end 38 which abuts against the housing 22. This spring 36 thus urges the latches 28 with their attached humps 34 to the locked position for the latches 28. In addition, a free end 40 of each bump abuts against a radially outwardly sloping surface 42 on its associated latch 28.

Figure 4:
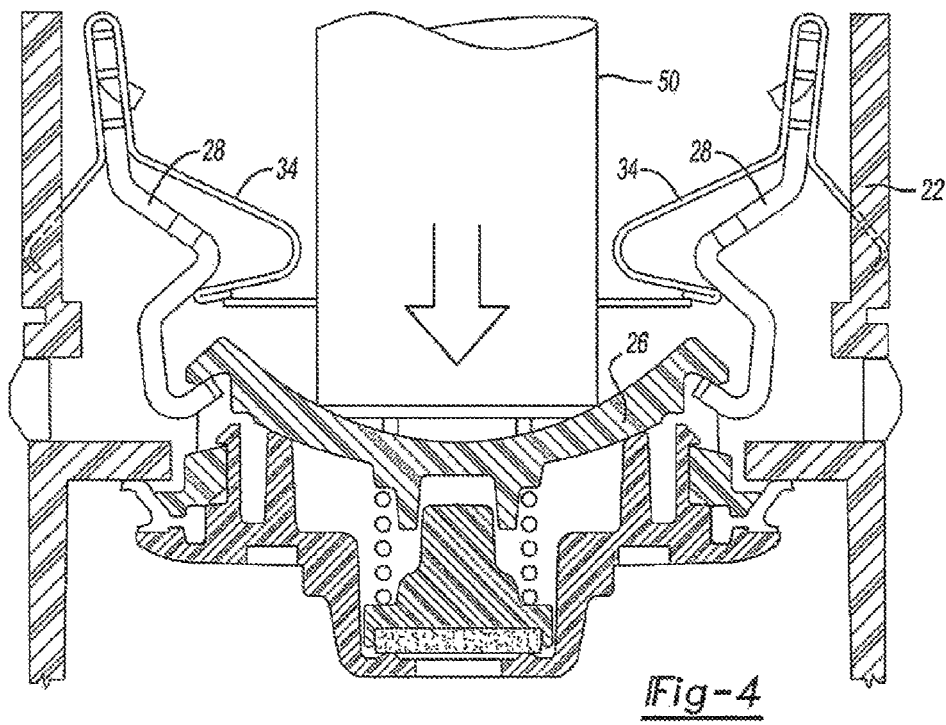
FIG. 4 is a diagrammatic view illustrating the operation of the present invention upon an attempt to fill the fuel tank with unleaded gasoline.

With reference now to FIG. 4, the bumps 34 on the latches 28 are dimensioned so that, in the event that a fuel filling nozzle 50 for unleaded gasoline is inserted into the housing 22, the diameter of the fuel filling nozzle 50 is less than the distance in between the bumps 34 on the latches 28. As such, upon insertion of the nozzle 50, at least one of the latches 28 will remain in its locked position and prevent fueling of the diesel fuel tank with unleaded gasoline.

Figure 5:
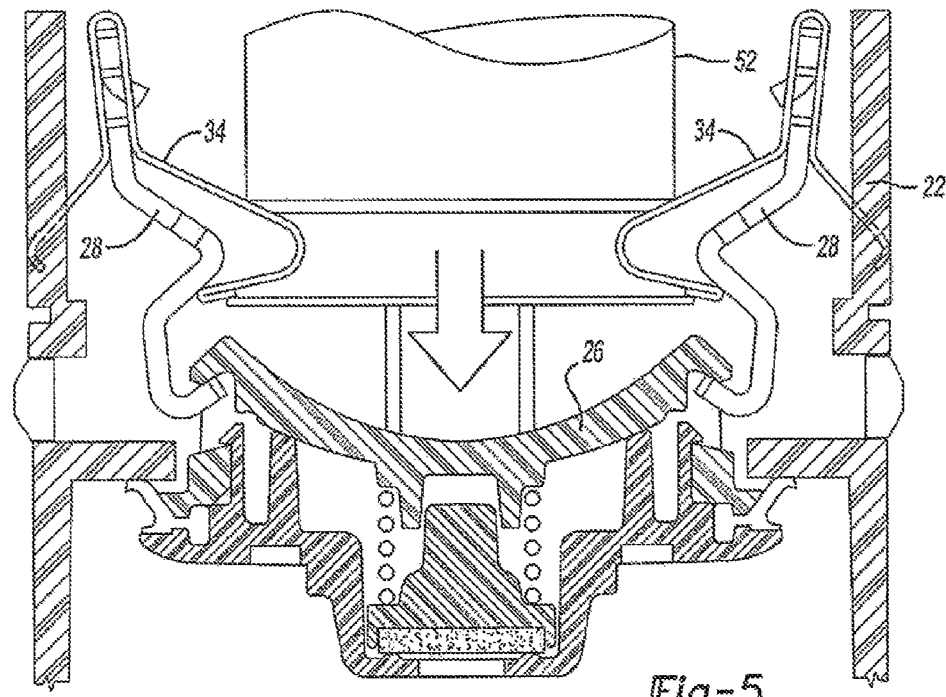
FIG. 5 is a view similar to FIG. 4, but illustrating an attempt to fill the fuel tank with diesel fuel in which the diesel fuel nozzle is relatively small.

With reference now to FIG. 5, upon insertion of a diesel fuel filling nozzle 52 into the housing 22, the diesel fuel filling nozzle 52, which is larger in diameter than the nozzle 50 (FIG. 4) for unleaded gasoline, will contact both bumps 34 of both latches 28. Upon further insertion of the nozzle 52 towards the flapper valve 26, the diesel nozzle 52 will pivot the latches 28 outwardly, as shown in phantom line, thus releasing the flapper valve 26. Further insertion of the nozzle 52 will contact the flapper valve 26 and pivot the flapper valve 26 to its open position to permit fueling of the diesel fuel tank.

Figure 6:
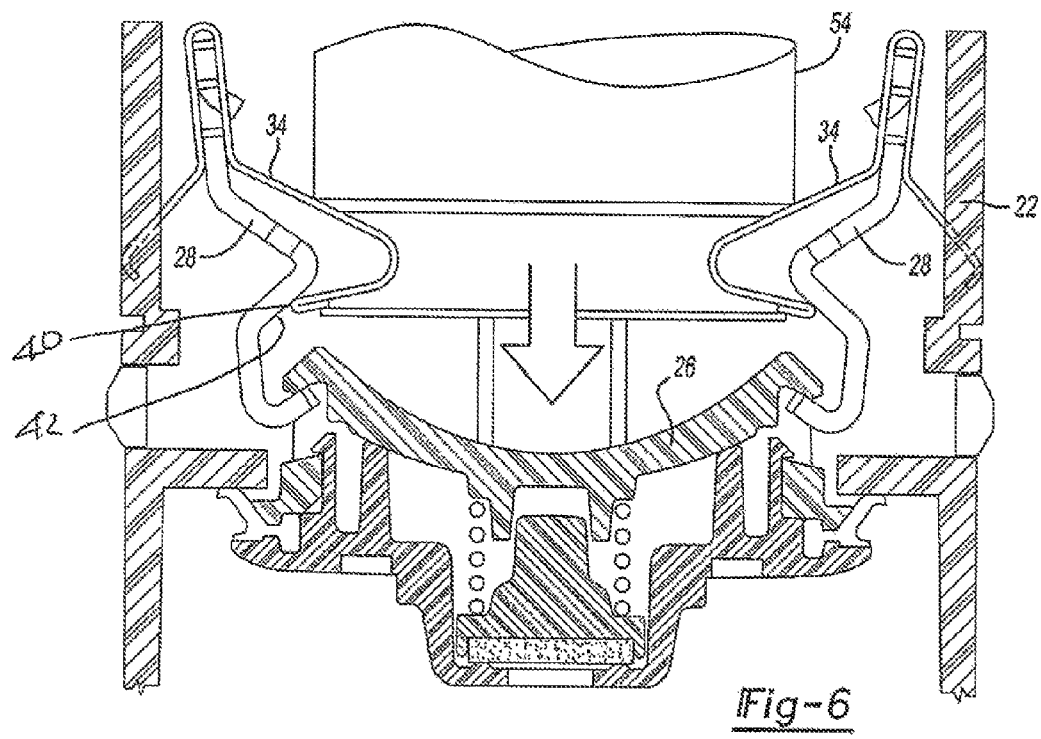
FIG. 6 is a view similar to FIG. 5, but illustrating an attempt to fill the fuel tank with a diesel fuel nozzle having a relatively large diameter.
Figure 7:
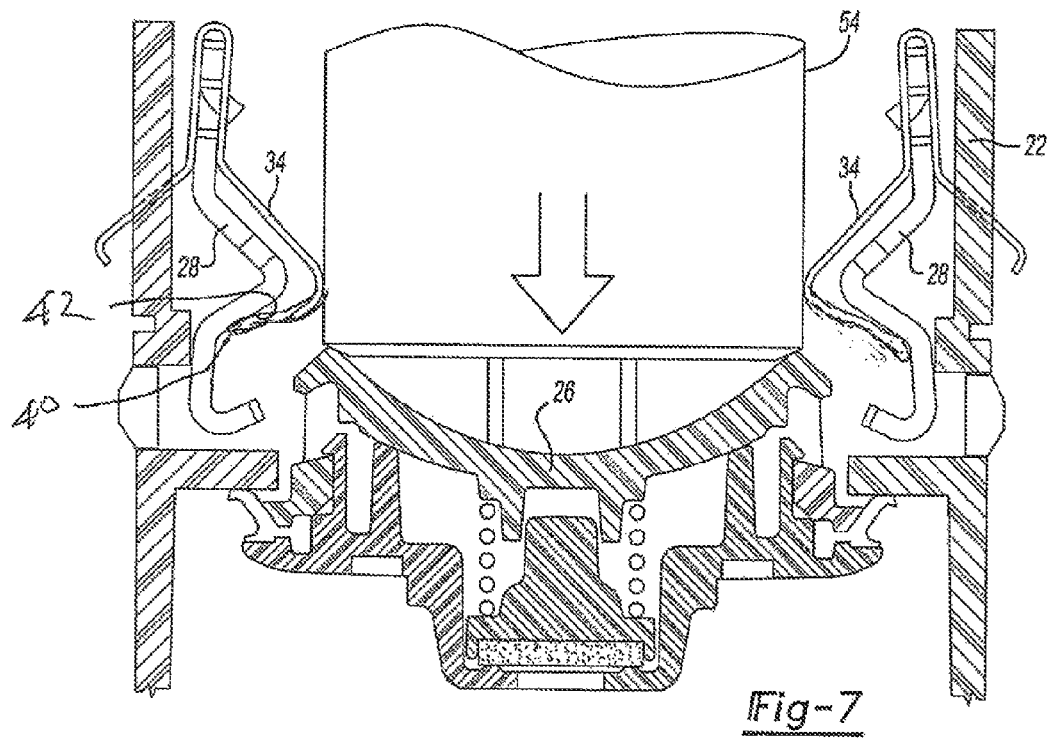
FIG. 7 is a fragmentary sectional view illustrating the operation of the latch and its associated bump when filling the fuel tank with a large diameter diesel fuel nozzle.

With reference now to FIGS. 6 and 7, a different diesel fuel nozzle 54 is shown which is significantly larger in diameter than the fuel nozzle 52 shown in FIG. 5. Such larger diameter fuel nozzles 54 are oftentimes found on commercial vehicles.

Upon insertion of the diesel nozzle 54 into the housing 22, the diesel nozzle 54 will first contact the bumps 34 so that the free ends 40 of the bumps 34 slide along the sloping surfaces 42 of the latches 28. The compressed bumps assist in pivoting their associated latches 28 to their release position thus releasing the flapper valve 26 to pivot to its open position to permit fueling of the diesel fuel tank.

However, upon further insertion of the large diameter diesel fuel nozzle 54, the diesel fuel nozzle 54 compresses the bump 34 against the latch 28 so that the latch 28 is sandwiched in between the collapsed bump 34 and the housing 22. Upon further insertion of the fuel nozzle 54, the fuel nozzle 54 passes through the fuel port in the housing 22.

A primary advantage of utilizing the collapsible bumps 34 is that they enable opening of the latches 28 for a relatively small diesel fuel nozzle 52 (FIG. 5) as well as the larger diameter diesel fuel nozzle 54 without increasing the overall diameter or size of the housing 22. Conversely, if the bumps 34 were rigid in construction, the bumps 34 would require a larger diameter housing 22 in order to accommodate pivoting of the latches 28 for both relatively small and relatively large diesel fuel nozzles.

Having described my invention, many modifications thereto will become apparent to those skilled in the art to which it pertains without deviation from the spirit of the invention as defined by the scope of the appended claims.

We claim:

1. A fuel inlet assembly comprising:

an elongated tubular and cylindrical housing open at each end, said housing defining a fluid port between said ends of said housing, a flapper valve associated with said fluid port, said flapper valve being movable between an open and a closed position and resiliently urged towards its closed positions, at least two annularly spaced rigid latches pivotally mounted to said housing adjacent said fluid port and pivotal about an axis perpendicular to an axis of said housing between a latch position and a release position, said latches engaging said flapper valve when at least one of said latches is in said latch position to thereby prevent said flapper valve moving to said open position, a flexible bump attached to each latch so that each bump pivots with its associated latch and each said bump protruding radially inwardly from its associated latch, each bump having a cam surface which, when engaged by a fuel nozzle, pivots said bump and its associated latch to said release position, wherein said each bump is collapsible in a radially outward direction toward its associated latch when said latch is in said release position to enable the fuel nozzle to pass said bumps and engage said flapper valve, wherein only a fuel nozzle within a predetermined size range will engage said cam surfaces of said bumps and pivot said latches to said release position and also allow the fuel nozzle to pass said bumps and extend through said fluid port,
wherein an upper end of each said bump is secured to its associated latch and wherein a lower end of each bump abuts against its associated latch.

2. The apparatus as defined in claim 1 and comprising a pressure relief valve contained in said flapper valves.

3. The apparatus as defined in claim 1 and comprising a spring which urges said flapper valve towards a closed position.

4. The apparatus as defined in claim 1 wherein said flapper valve comprises a first valve part and a second valve part secured together by a snap fitting.

5. The apparatus as defined in claim 4 and comprising a pressure relief valve at least partially contained between said valve parts.

6. The apparatus as defined in claim 1 wherein said latches are elongated, pivotally secured to said housing adjacent one end and having a valve engaging hook at their other ends, said cam surface position between said ends of said latches.

7. A fuel inlet assembly comprising:
an elongated tubular and cylindrical housing open at each end, said housing defining a fluid port between said ends of said housing,
a flapper valve associated with said fluid port, said flapper valve being movable between an open and a closed position and resiliently urged towards its closed positions,
at least two annularly spaced rigid latches pivotally mounted to said housing adjacent said fluid port and pivotal about an axis perpendicular to an axis of said housing between a latch position and a release position,
said latches engaging said flapper valve when at least one of said latches is in said latch position to thereby prevent said flapper valve moving to said open position,
a flexible bump attached to each latch so that each bump pivots with its associated latch and each said bump protruding radially inwardly from its associated latch,
each bump having a cam surface which, when engaged by a fuel nozzle, pivots said bump and its associated latch to said release position,
wherein said each bump is collapsible in a radially outward direction toward its associated latch when said latch is in said release position to enable the fuel nozzle to pass said bumps and engage said flapper valve,
wherein only a fuel nozzle within a predetermined size range will engage said cam surfaces of said bumps and pivot said latches to said release position and also allow the fuel nozzle to pass said bumps and extend through said fluid port wherein an upper end of each said bump is secured to its associated latch and wherein a lower end of each bump is positioned closely adjacent its associated latch wherein an upper end of each said bump is secured to its associated latch and wherein a lower end of each bump is positioned closely adjacent its associated latch.

8. The apparatus as defined in claim 7 and comprising a pressure relief valve contained in said flapper valves.

9. The apparatus as defined in claim 7 and comprising a spring which urges said flapper valve towards a closed position.

10. The apparatus as defined in claim 7 wherein said flapper valve comprises a first valve part and a second valve part secured together by a snap fitting.

11. The apparatus as defined in claim 10 and comprising a pressure relief valve at least partially contained between said valve parts.

12. The apparatus as defined in claim 7 wherein said latches are elongated, pivotally secured to said housing adjacent one end and having a valve engaging hook at their other ends, said cam surface position between said ends of said latches.

* * * * *